(12) United States Patent
Luh et al.

(10) Patent No.: US 6,682,451 B1
(45) Date of Patent: Jan. 27, 2004

(54) HYDRAULIC CONTROL FOR A CONTINUOUSLY VARIABLE TRANSMISSION

(75) Inventors: Joachim Luh, Bietigheim-Bissingen (DE); Wilhelmus Johannes Maria Van Wijk, Udenhout (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,454
(22) PCT Filed: Dec. 18, 1999
(86) PCT No.: PCT/EP99/10104
§ 371 (c)(1),
(2), (4) Date: Aug. 6, 2001
(87) PCT Pub. No.: WO00/37834
PCT Pub. Date: Jun. 29, 2000

(30) Foreign Application Priority Data

Dec. 28, 1998  (DE) .......................... 198 59 425

(51) Int. Cl.$^7$ ............................................. F16H 63/00
(52) U.S. Cl. ............................................ 474/28; 474/18
(58) Field of Search ............................ 474/18, 28, 69

(56) References Cited

U.S. PATENT DOCUMENTS

| 4,685,358 A | * | 8/1987 | Itoh | 477/41 |
| 4,733,582 A |   | 3/1988 | Eggert | 74/867 |
| 4,846,765 A | * | 7/1989 | Sakai | 474/28 |
| 5,409,421 A | * | 4/1995 | Sakai et al. | 474/28 |
| 5,930,997 A | * | 8/1999 | Hayashi et al. | 60/468 |
| 5,944,626 A | * | 8/1999 | Spiess et al. | 474/28 |
| 5,971,876 A |   | 10/1999 | Spiess et al. | 474/28 |
| 6,090,000 A | * | 7/2000 | Senger | 474/18 |

FOREIGN PATENT DOCUMENTS

| DE | 44 10 311 A | 9/1995 |
| DE | 195 19 162 A | 11/1996 |
| DE | 195 19 162 A1 | 11/1996 |
| DE | 196 09 787 A | 9/1997 |
| WO | 97/34093 | 9/1997 |

* cited by examiner

Primary Examiner—Thomas R. Hannon
Assistant Examiner—Vicky A. Johnson
(74) Attorney, Agent, or Firm—Michael J. Striker

(57) ABSTRACT

A hydraulic controller (10, 10a, 10b) for a continuously variable transmission (12) is proposed. Using a pump (42), the delivery chambers (24, 26) of a first and second adjusting device (14, 16) are acted upon to alter the transmission ratio of the transmission (12). The valve (36, 36a, 36b), which can be controlled using a pressure drop created at a throttle position (50), serves to control the pressure in the delivery chamber (24). According to the invention, additional means are provided to prevent an adjustment of the transmission (12) in the "low" direction in the (N) operating state and, as necessary, in the (P) and (N) operating states.

23 Claims, 3 Drawing Sheets

HYDRAULIC CONTROL FOR A CONTINUOUSLY VARIABLE TRANSMISSION

BACKGROUND INFORMATION

The invention provides a hydraulic controller for a continuously variable transmission according to the independent claims. DE 195 19 162 A1 makes known a hydraulic controller for a continuously variable transmission, especially for a twin V-pulley belt wrap transmission. It is used preferably during a failure of the electrical power supply to an electrohydraulic controller of the continuous transmission. The hydraulic controller has a pump for acting upon the delivery chambers of a first and second adjusting device for altering the transmission ratio of the transmission. A means is provided to control the pressure in the delivery chamber of the first adjusting device in the form of a valve that can be controlled by way of a pressure drop created at a throttle position. In the first control position, the valve connects the delivery chamber of the first adjusting device with the pump by way of a line installed after the valve.

The effective surface of the delivery chamber of the first adjusting device is greater than the effective surface of the delivery chamber of the second adjusting device. If the valve for controlling the pressure in the delivery chamber of the first adjusting device has been shifted through entirely, the same pressure is present in both delivery chambers. The greater resultant compressive force therefore occurs at the first adjusting device. As a result, the transmission ratio of the transmission tends to increase, i.e., to step up. As a result, the engine speed either decreases while the vehicle speed remains the same, or the vehicle speed increases while the engine speed remains the same. Certain intermediate values are also possible.

The pressure drop created at the throttle position is basically proportional to the engine speed. If the engine revs up, the pressure drop is high. The valve shifts through and the gear ratio becomes smaller. If the pressure drop decreases at a low engine speed, the pressure escapes through the valve for emergency operation, and the gear ratio of the transmission increases. The smallest gear ratio of the transmission is referred to here as "low", and the largest is referred to as "overdrive".

If the vehicle is shifted into neutral during rapid forward driving, the clutch is disengaged automatically. The engine speed can also decrease as a result. The valve shifts thereby in such a way that the pressure in the delivery chamber of the first adjusting device decreases and the resultant compressive force becomes smaller than the compressive force in the delivery chamber of the second adjusting device. The gear ratio of the transmission is adjusted to "low". If the vehicle is now shifted from neutral into forward driving again, the clutch engages. Since the gear ratio of the transmission is at "low", the input shaft then turns much more quickly than the output shaft. As a result, the engine speed increases rapidly. This can lead to mechanical damage and pose a risk to safety, and the vehicle passengers perceive it as being uncomfortable, because the vehicle decelerates abruptly.

Moreover, only one pump is provided in this hydraulic controller, which supplies the delivery chambers of the adjusting devices on the one hand and, on the other, is used for the valves of the hydraulic controller. For this reason, a high-pressure pump must be provided in order to perform both functions. Since higher pressures are therefore produced, especially at the control inputs of the valves, this leads to high leakage rates. In addition, this also results in increased fuel consumption.

Moreover, WO 97/34093 discloses a hydraulic controller that includes a means in the form of a valve having a first shift position in the forward driving operating state for an adjustment of the transmission in the "overdrive" direction. The transmission can only be adjusted in the "low" direction by way of an additional switching position, whereby, however, the valve becomes more complex and, therefore, more expensive. If this valve is located in the neutral operating state, the result is that the transmission moves into the "overdrive" transmission ratio. Means for preventing an adjustment in the "low" direction, which also means that the gear ratio remains constant, are not provided.

ADVANTAGES OF THE INVENTION

The hydraulic controller according to the invention and according to the independent claims has the advantage, on the other hand, that, after shifting from the forward driving or, possibly, the reverse operating state into the neutral operating state at least, especially during rapid driving, an undesired adjustment of the transmission to "low" is avoided entirely or at least to the greatest extent, and that the transmission can be adjusted in the "overdrive" and "low" directions in one shift position in the forward driving operating state.

This can be achieved especially easily by providing a shift valve, especially a manual shift valve, having four shift positions for the park P, reverse R, neutral N, and forward driving D operating states. It is advantageous hereby to ensure that, in the second control setting of the valve, the intermediate line at the port of the valve is connected with a drainage port of the valve, that the drainage port is connected by way of a line in which a throttle is preferably situated with a first port of the shift valve that is closed in the shift positions P and N and that is connected with a second port in the shift positions R and D which leads to a lower pressure level, e.g, a tank.

In a further design example, the port is closed in the second control setting of the valve, which makes an even simpler design possible. It is advantageous hereby if a branching line in which a throttle is preferably situated is connected to an intermediate line, which branching line is connected with a first port of the shift valve that is closed in the shift positions P and N and that is connected with a tank in the shift positions R and D by way of a second port.

According to a further design example, it is especially appropriate to connect a branching line to the intermediate line, which branching line is connected by way of a connecting line with the line that is installed after the throttle position in the delivery direction, and a throttle is to be situated in the connecting line. It is advantageous thereby if a line branches between the throttle and the throttle position that leads to a second control input of the valve. It is beneficial hereby to connect a line between the throttle and the throttle position that leads to a second port of the shift valve, which line is connected in the shift positions P, R and N with a first port to which a control line is connected that is connected with a third control input of the valve, and that the first port in the shift position D is connected with a tank port.

If the supply lines of the delivery chambers are connected with a pressure port of a pressure limiting valve, the pressure—especially in the delivery chamber of the second adjusting device—can be adjusted in such a way that the means of transmission are not subjected to unnecessary wear.

It is advantageous if the throttle position is situated in a switch-over valve having two shift positions. In this design, a spring is provided at a first control input of the switch-over valve, and an electrical or hydraulic actuation is provided at its second control input. The switch-over valve includes, in an appropriate manner, a first pressure port and a first port that are connected with each other in the first shift position by way of the throttle position and, in the second shift position, by way of a basically pressure drop-free connection. It is advantageous to provide a first control line that is connected in the delivery direction before the switch-over valve and is connected with the first control input of the valve, and to situate a second control line in the delivery direction after the switch-over valve that is connected with the second control input of the valve.

A simple design is achieved hereby by connecting the second control line, which is installed in the delivery direction after the switch-over valve, with a second pressure port of the switch-over valve that is connected in the first shift position with a second port that is connected with the second control input of the valve by way of the control line. The second pressure port is thereby closed in the second shift position of the switch-over valve. Moreover, the switch-over valve includes a tank port that is closed in the first shift position and is connected with the second port in the second shift position.

For use in emergency operation it is advantageous if a branching line that is connected with the delivery chamber of the first adjusting device is connected to a third pressure port of the switch-over valve. The pressure port is connected with a third port in the first shift position and it is closed in the second shift position. The third port is connected hereby with the second control input of the pressure limiting valve by way of a line. In the second shift position of the switch-over valve, the third port is connected with the tank port of the switch-over valve.

If the throttle position is installed after a second pump that generates a lower pressure range than the at least first pump—whereby it is appropriate for the first pump to be a high-pressure pump and for the second pump to be a low-pressure pump—very low leakage rates occur in an advantageous manner. This also results in reduced fuel consumption.

It is appropriate if an additional pressure limiting valve is installed after the throttle position.

The hydraulic controller is simplified further if the valve for the emergency operation is also used for normal operation.

Further advantages and advantageous further developments of the hydraulic controller according to the invention arise out of the subclaims and the description.

DRAWING

Design examples of the invention are presented in the drawing and explained in greater detail in the subsequent description.

DESCRIPTION OF THE DESIGN EXAMPLES

Figure 1:
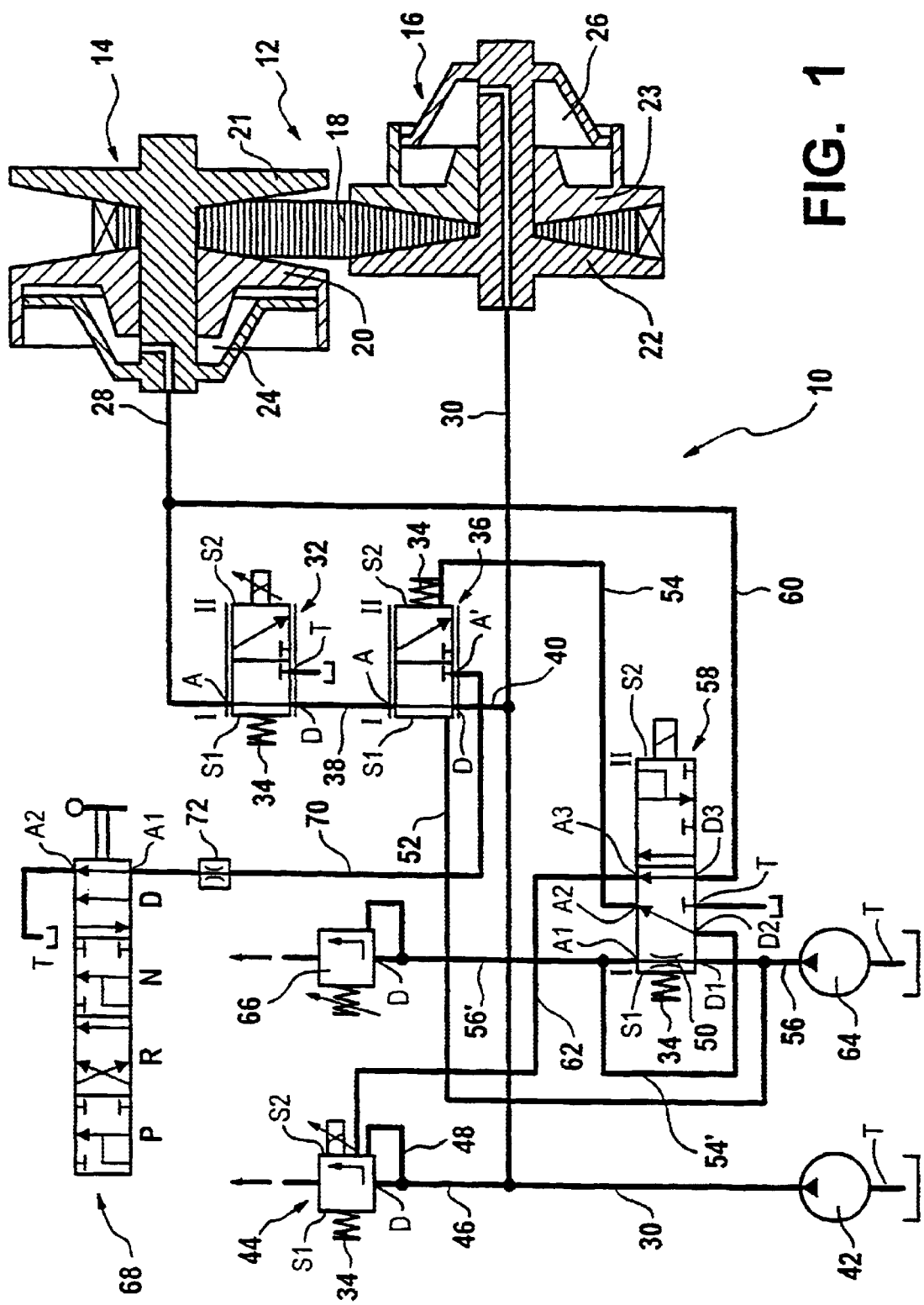
FIG. 1 shows a first design example of a hydraulic controller.

FIG. 1, as the first design example, shows the cutout of a hydraulic controller 10 for a continuously variable transmission 12. The hydraulic controller 10 is used preferably during a failure of the electric power supply to an electrohydraulic controller of the continuously variable transmission 12. It is also feasible, however, to use the hydraulic controller 10 for normal operation of the transmission 12.

The present design example concerns a twin V-pulley belt wrap transmission, which is also called a variator or CVT transmission. It is also feasible, however, that, instead of a twin V-pulley belt wrap transmission, another continuously variable transmission is used, such as a bevel friction wheel planetary transmission or the like. The transmission 12 includes a first and a second adjusting device 14, 16. The first adjusting device 14 is arranged on a drive-end shaft, and the second adjusting device 16 is arranged on a drive-end shaft of the transmission 12. The transmission 12 encompasses two V-pulleys, between which a means of transmission 18, such as a steel thrust belt, a chain, a V-belt or something like that is situated. Each of the two V-pulleys comprises two V-pulley halves 20, 21, 22, 23, which are designed in such a way that they can be loaded against each other using hydraulic forces. The piston and cylinder parts required for this are preferably integrated at least in one part of the V-pulley halves 20, 23. The respective operating pressure is applied to the delivery chambers enclosed by these parts, on the primary side of at least one delivery chamber 24 and on the secondary side of the delivery chamber 26, according to the set transmission ratio. The effective surface of the delivery chamber 24 of the first adjusting device 14 is usually greater than the effective surface of the delivery chamber 26 of the second adjusting device 16. Transmissions also exist that include two delivery chambers in a first adjusting device, whereby, again, a greater effective surface is produced overall.

If the primary-side V-pulley halves 20, 21 are close to each other and the secondary-side V-pulley halves 22, 23 are far apart from each other, the means of transmission 18 runs on a large radius on the primary side, and on a small radius on the secondary side. As a result, the gear ratio of the transmission 12, i.e., the ratio of the input speed to the output speed, is large, with the greatest value referred to here as "overdrive". If the primary-side V-pulley halves 20, 21 are far apart from each other and the secondary-side V-pulley halves 22, 23 are close to each other, the means of transmission runs on a small radius on the primary side, and on a large radius on the secondary side. As a result, the gear ratio of the transmission 12, i.e., the ratio of the input speed to the output speed, is low, with the lowest value referred to here as "low".

A supply line 28 is connected to the delivery chamber 24 of the first adjusting device 14, and a supply line 30 is connected to the delivery chamber 26 of the second adjusting device 16. The supply line 28 for the delivery chamber 24 of the first adjusting device 14 is connected to a port A of a valve 32 for normal operation. Valve 32 for normal operation in the present design example is a control valve, whereby a proportional valve or a shift valve are also feasible. The valve 32 has two control settings I, II. A spring 34 designed as a compression spring is situated at a control input S1, and a magnetic acutation is provided at a second control input S2, whereby an electrohydraulic actuation is also possible. In the first control setting I, the port A is connected with a pressure port D. A tank port T is closed in this case. In the second control setting II, port A is connected with the tank port T, and the pressure port D is closed. If the second control input S2 is not activated, the valve 32 is brought into control setting I due to the elastic force of the compression spring 34.

The valve 32 for normal operation is installed after a valve 36 which is used at least for emergency operation, and for normal operation if necessary. It is also possible that valve 36 is installed after valve 32. In the present design example, the pressure port D of valve 32 for normal operation is connected to a port A of valve 36 for this purpose by way of an intermediate line 38. A connecting line 40 runs from a pressure port D of valve 36 to the supply line 30 for the delivery chamber 26 of the second adjusting device 16.

The supply line 30 is connected with a first pump 42 to act upon the delivery chambers 24, 26. The first pump 42 is a high-pressure pump. The pressure range delivered by the first pump 42 lies in a range of approximately 4 to 80 bar. This pressure range is necessary for the sufficient supply of delivery chambers 24, 26, so that the transmission ratio of the transmission 12 can be altered and sufficient contact pressure of V-pulley halves 20, 21, 22, 23 is still provided on the means of transmission 18. The first pump 42 is therefore connected with the delivery chambers 24, 26 of the first and second adjusting device 14, 16 by way of the supply lines 30, 28—the intermediate line 38 and the connecting line 40 are also supply lines in this sense—to alter the transmission ratio of the transmission 12. In this respect, the supply line 30 also applies hydraulic fluid to the delivery chamber 24.

The supply line 30, at least, is connected with a pressure port D of a pressure limiting valve 44. In the present design example, this takes place by way of a line 46. A spring 34 designed as a compression spring is situated at the first control input S1 of the pressure limiting valve 44. An electrical or hydraulic actuation and a return line 48 that is connected with the line 46 or directly with the supply line 30 are provided at the second control input S2.

In emergency operation, the valve 36 serves to control the pressure in the delivery chamber 24 of the first adjusting device 14, and it can be controlled in known fashion with a pressure drop created at a throttle position 50. The valve 36 is connected with the delivery chamber 24 of the first adjusting device 14 by way of the at least one intermediate line 38 which is connected to port A of valve 36. In a first control setting 1, the pressure port D is connected with the port A and the delivery chamber 46 is connected with the pump 42 for this purpose. On the side of the pressure port D, valve 36 also has a drainage port A', which is closed in the first control setting I of the valve 36. A first control input S1 of the valve 36 is acted upon by a first control line 52, and a second, opposing control input S2 is acted upon by a second control line 54. In addition, a spring 34 is provided on this second control input S2. The first control line 52 is connected with a hydraulic line 56 that is situated in the delivery direction before the throttle position 50. The throttle position 50 is preferably arranged in a switch-over valve 58. In this regard, the first control line 52 in the delivery direction is also connected before the switch-over valve 58. The switch-over valve 58 has two shift positions I and II. A spring 34 is provided at the first control input S1 of the switch-over valve 58, and an electrical or hydraulic actuation is provided at the second control input S2. The switch-over valve 58 has at least one first pressure port D1 and a first port A1 that are connected with each other in the first shift position I by way of the throttle position 50 and in the second shift position II by way of a basically pressure drop-free connection.

The hydraulic line 56' installed in the delivery direction after the throttle position 50 and the switch-over valve 58 is connected in an advantageous manner with a second pressure port D2 of the switch-over valve 58 by way of a control line 54'. The second pressure port D2 is connected with a second port A2 of the switch-over valve 58 in the first shift position I of the switch-over valve 58. The second port A2 is connected with the second control input S2 of the valve 36 by way of the second control line 54. The second pressure port D2 is closed in the second shift position II of the switch-over valve 58. Furthermore, the switch-over valve 58 includes a tank port T that is closed in the first shift position I and is connected with the second port A2 in the second shift position II of the switch-over valve.

For emergency operation it is important that the first control line 52 connected in the delivery direction before the switch-over valve 58 is provided and connected with the first control input S1 of the valve 36, and that the second control line 54, 54' is situated in the delivery direction after the switch-over valve 58, which second control line 54, 54' is connected with the second control input S2 of the valve 36. It is advantageous here that the second control line 54' and the hydraulic line 56'—both of which are installed after the switch-over valve 58 and the throttle position 50 in the delivery direction—are connected with the second pressure port D2 of the switch-over valve 58.

A branching line 60 is provided that is connected with the first supply line 28 and is therefore connected with the delivery chamber 24 of the first adjusting device 14. The branching line 60 is connected to a third pressure port D3 of the switch-over valve 58. The third pressure port D3 is connected with a third port A3 in the first shift position I and is closed in the second shift position II. The third port A3 is connected with the second control input S2 of the pressure limiting valve 44 by way of a line 62, and with the tank port T of the switch-over valve 58 in the second shift position II of the switch-over valve 58. In this manner, the pressure of the delivery chamber 24 of the first adjusting device 14 can be directed to the second control input S2 of the pressure limiting valve 44. The pressure can thereby be regulated in the delivery chamber 26 and indirectly in the delivery chamber 24, which makes it possible to prevent especially high pressures that damage the means of transmission 18.

The throttle position 50 and the switch-over valve 58 are installed after a second pump 64 that creates a lower pressure range than the first pump 42. The second pump is a "low-pressure pump" that can create a pressure range of approximately 2 to 7 bar. The first pump 42 thus serves to supply the delivery chambers 24, 26, where high pressures are required, and the second pump 64 serves to supply the valves 36, 58, with which the pressures in the delivery chambers 24, 26 are controlled. In fact, it is also possible to apply the high pressure level of the pump 42 to the hydraulic controller 56 and, therefore, the valves 36, 58. By using the second pump 64—which can be a pump that is already present—much smaller leakage rates occur, however. As a result, the valves 36, 58 can be dimensioned more favorably as well. A further result of this is that fuel consumption decreases.

An additional pressure limiting valve 66 is installed after the throttle position 50 and the switch-over valve 58 by way of the hydraulic line 56'. As a result of this arrangement, the pressure level at the control inputs of the valve 36 can also be regulated in an advantageous manner.

For the park P, reverse R, neutral N and forward driving D operating states, a device designed as a shift valve 68 is provided, whereby it is a manual shift valve in the present design example. It is entirely common and basically known to use a valve for the operating states named. Instead of a device of this type, however, it is also feasible to provide another device or multiple devices for the park P, reverse R, neutral N and forward driving D operating states. For example, a separate valve can be provided for each operating state, or electromotive actuators can also be used, for instance, that take on the functions of the shift valve 68. The use of the shift valve 68 is very favorable, however, because, as a result, just one device is required for the park P, reverse R, neutral N and forward driving D operating states. The shift valve 68 has at least four shift positions P, R, N, D for the respective park P, reverse R, neutral N and forward driving D operating states. There are situations in which a vehicle having a transmission 12 described at the beginning includes even further transmission ratios that are realized, for instance, using pairs of gear wheels that gear down. This can provide advantages on step inclines or with loads, for instance. As a result, it can be possible that multiple forward gears are present for the forward driving operating state. They are referred to collectively here using the term forward driving D. If the shift valve 68 also shifts additional forward gears, they can be realized, for instance, using additional shift positions D1, D2, etc., 1, 2, etc., 1, 3, or 2, 4, etc.

The shift valve 68 includes at least a first port A1 and an opposing, second port A2. The second port A2 leads to a low pressure level, e.g., tank T, or it can also be designed directly as a tank port T. In the shift positions R and D, the first and the second ports A1, A2 are connected with each other and they are closed in the shift positions P and N, which is also possible in the shift position R as an alternative. It is also feasible that the first and second ports A1, A2 are connected with each other in the shift position P. Multiple additional functions can also be carried out in a simple manner using the ports A1, A2.

In the second control setting II of the valve 36, the intermediate line 38 at port A of the valve 36 is connected with the discharge port A' of the valve 36. The discharge port A' is connected with the first port A1 of the shift valve 68 by way of a line 70 in which a throttle 72 is preferably situated.

In normal operation, i.e., when an electrical power supply is available for an electrohydraulic controller of the continuous transmission 12, the switch-over valve 58 is located in shift position II due to the electrical or hydraulic actuation at the second control input S2. In this case, the ports A2, A3 are connected with the tank port T. As a result, the second control line 54 and the line 62 are emptied. Now the limiting pressure of the pressure limiting valve 44 can be altered by way of the electrical or hydraulic actuation at the second control input S2. As a result, the pressure in the supply line 30 and, therefore, in the delivery chamber 26 of the second adjusting device 16, is adjusted by way of the pressure limiting valve 44. The pressure is varied hereby in such a way that sufficient contact pressure is available for the means of transmission 18. The pressure is as low as possible, however, so that the means of transmission 18 is not subjected to unnecessary wear.

Since the second control line 54 of the valve 36 is also connected with the tank port T of the switch-over valve 58, the valve 36 is brought into the first control setting I as a result of the pressure in the hydraulic line 56 and the first control line 52 that acts upon the first control input S1 of the valve 36. The pressure present in the control line S1 is adjusted by the additional pressure limiting valve 66. Since the second pump 64 is a low-pressure pump, only very small leakage rates occur at the valve 36. Simpler and more cost-effective components for the hydraulic controller 10 can thereby be used in an advantageous manner.

The oil feed and oil drainage in the delivery chamber 24 of the first adjusting device 14 are adjusted using the valve 32 for normal operation, by way of which the transmission ratio of the transmission 12 can be altered. The corresponding control setting I, II is adjusted by the electrical or hydraulic actuation at the second control input S2 and the elastic force of the spring 34 at the first control input S1.

In emergency operation, i.e., during a failure of the electrical power supply to the electrohydraulic controller of the continuous transmission 12, the switch-over valve 58 is brought into shift position I by way of the elastic force of the spring 34 at the first control input S1. As a result, the pressure in the delivery chamber 24 of the first adjusting device 14 is present at the second control input S2 of the pressure limiting valve 44 by way of the supply line 28, the branching line 60, the third pressure port D3 as well as the third port A3 of the switch-over valve 58 and the line 62. This results in an adjustment or alteration of the pressure in the delivery chamber 26 of the second adjusting device 16 that is a function of the transmission ratio, which pressure is present by way of the supply line 30 and the line 46 at the pressure port D of the pressure limiting valve 44. The pressure limiting valve 44 therefore represents a means of controlling the transmission ratio of the transmission 12.

The valve 32 for normal operation is brought into the control setting I in emergency operation by way of the elastic force of the spring 34 at the first control input S1. The adjustment of the pressure in the delivery chamber 24 of the first adjusting device 14 is now carried out by way of the valve 36. The control settings I, II of the valve 36 are hereby adjusted by way of the pressures present at the first control input S1 and the second control input S2. The pressures are hereby determined by the pressure drops present at the throttle position 50. This pressure drop is, once again, a function of the rate of oil flow that flows through the hydraulic line 56, 56'. The oil flow rate is determined by the delivery rate of the second pump 64 which, in turn, is a function of the rotational speed of the pump. Since the pump 64 is driven by an engine, especially an internal combustion engine, the pressure drop at the throttle position 50 is a function of the engine speed. At a high engine speed, the valve 36 is brought into the control setting I due to the higher oil pressure compared with the oil pressure in the second control line 54 than in the first control line 52, which higher oil pressure also overcompresses the spring 34. The same pressures are thereby present in the delivery chambers 24, 26. Since the delivery chamber 24 of the first adjusting device 14 has a greater effective surface than the delivery chamber 26 of the second adjusting device 16, the transmission 12 takes on a gear ratio that goes in the direction "overdrive", whereby the engine speed is decreased again if necessary.

At low engine speeds, the valve 36 moves into the control setting II, whereby oil can flow out of the delivery chamber 24 of the first adjusting device 14. The oil flows hereby from the discharge port A1 of the valve 36 through the line 70 to the first port A1 of the shift valve 68. In the shift positions R and D, which correspond to the reverse R and forward driving D operating states, the oil can flow to the tank T by way of the second port A2. The oil does not necessarily have to drain to the tank T. It is sufficient if it is directed to a pressure that is lower than the delivery chamber 24 or to a lower pressure level, so that it can drain off. In an alternative design of the shift valve 68 described previously, this takes place only in the shift position D. By selecting the size of the throttle 72 accordingly, the speed at which the transmission 12 takes on a gear ratio that moves in the "low" direction can be influenced in a simple manner. This speed is adjusted to values that are comfortable for the driver. The valve 36 is therefore a means that makes an adjustment of the transmission in the "overdrive" and "low" directions in the D and R operating states possible.

If the shift valve 68 in the shift position P or N, the port A1 is closed. If the valve 36 is hereby in the second control setting II, the intermediate line 38 is blocked. Oil can therefore not escape from the delivery chamber 24 of the first adjusting device 14 by way of the intermediate line 38 and the supply line 28. As a result, the gear ratio of the transmission 12 cannot be adjusted in the "low" direction. If the vehicle is shifted from the shift position D into the shift position N at a high driving speed, for instance, the clutch disengages. If, as a result, the engine speed also drops to idling speed, for instance, the pressure drop decreases at the throttle position 50, whereby the valve 36 is brought into control setting II. If a tank were situated at the discharge port A1, for instance, oil could flow out of the delivery chamber 24 of the first adjusting device 14. The gear ratio of the transmission 12 would thereby move in the "low" direction. If the vehicle were then shifted into shift position D again and the clutch were engaged, the engine would have to suddenly turn very fast, which would be expressed as a roaring of the engine, for instance. This is prevented in an advantageous manner by the blocking of the intermediate line 38 in the P or N operating states, or by way of the corresponding shift positions of the shift valve 68 and in the second control setting II of the valve 36. In summary, it can also be said that the shift valve 68 with the accompanying lines 28, 38, 70 in particular serves to prevent adjustment of the transmission 12 in the "low" direction, at least in the neutral or park operating states. Alternatives to the use of the shift valve 68 were explained previously.

Instead of blocking the intermediate line 38 and, therefore, the delivery chamber 24 by way of the shift valve 68, other measures are also possible. When the vehicle is shifted into the N operating state, the clutch of the vehicle is disengaged. By using a signal that represents the disengaged state, the intermediate line 38 or else the supply line 28—which also functions as an intermediate line in this case—can be blocked by an additional shift valve that shifts through in one shift position and blocks in another shift position. This can occur, for instance, in that the control pressure of basically known hydraulic clutches is utilized to shift this additional valve. It is also feasible an adjustment of the gear ratio of the transmission 12 in the "low" direction in emergency operation is possible only in the shift position D of the shift valve 68 or only in the D operating state. If means are provided that ensure that shifting can take place only in shift position D when the vehicle is at a standstill, this adjustment of the transmission 12 can also be made possible in this shift position or in this operating state. It is thereby also possible to start the vehicle in a transmission ratio that is perhaps more favorable for the vehicle.

It is naturally understood that the valve 32 for normal operation can also be eliminated completely, and control of the transmission 12 is performed only by way of the valve 36 in normal operation.

A fundamental point about the first design example is that additional means are provided that prevent an adjustment of the transmission 12 in the "low" direction at least in the neutral operating state. It is also advantageous to prevent this in the park operating state as well, however. This may also be appropriate in the reverse operating state if necessary. The additional means prevent an adjustment of the transmission 12 in that the pressure level of the delivery chamber 24 of the first adjusting device 14 is not shifted to a lower pressure level, such as a tank T, for instance. For this purpose, a device such as the valve 68, for instance, must be provided in a line 28, 38, 70 that is closed in the neutral operating state at least. In the forward driving operating state at least, this valve 68 shifts the pressure level of the delivery chamber 24 to a lower pressure level, such as a tank T, for instance, to adjust the transmission 12 in the "low" direction.

Expressed in other words, additional means are provided in the first design example that make an adjustment of the transmission 12 in the "low" direction possible only in the forward driving D operating state. Such an adjustment in the reverse R operating state is possible as well, however. If a device is provided that makes the park P operating state or the shift position P of the shift valve 68 possible only when the vehicle is at a standstill, the adjustment can take place here as well. The additional means are basically the connection of the port A with the discharge port A' of the valve 36 in the control setting 11 and the line 70, which are connected with a lower pressure or pressure level or a tank T in the corresponding operating states of forward driving D and, if necessary, reverse R, and, possibly, park P.

For a more detailed description of the function of the hydraulic controller 10 in emergency operation with regard for the alteration of the transmission ratio of the transmission 12, in particular concerning the behavior of the valve 36 as a function of the pressure drop at the throttle position 50 and the pressure limiting valve 44, express reference is made for the rest to the disclosure of DE 195 19 162 A1 and U.S. Pat. No. 5,971,876.

As an alternative to the valve 36, pressure can also be applied to both delivery chambers 24, 26 by way of supply lines 28, 30 that are not dependent on each other. One more separate limiting valve can then be provided at each delivery chamber 24, 26 that has a control input, because pressure that is a function of engine speed, for instance, or another control variable is applied. Such designs are the state of the art.

Figure 2:
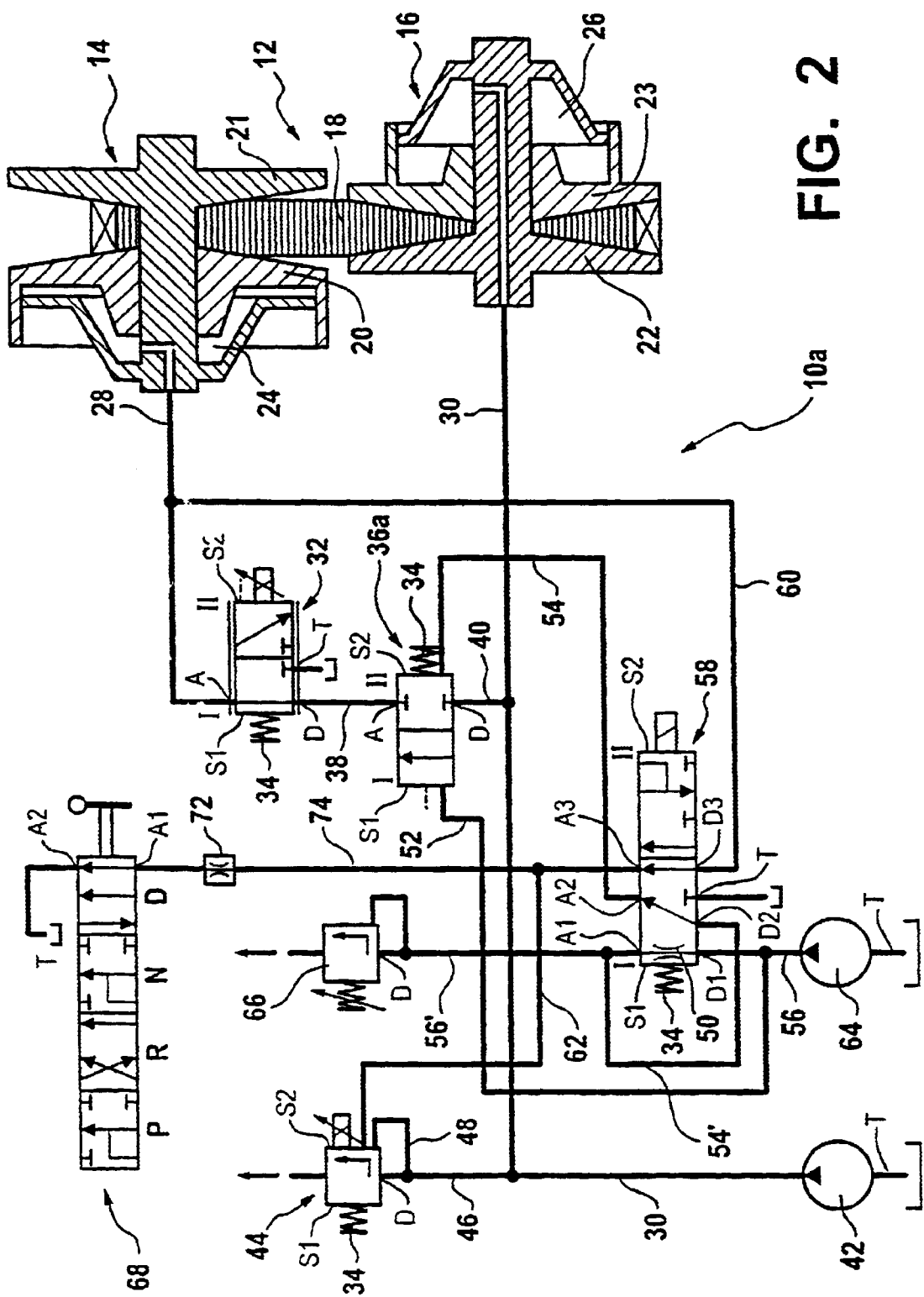
FIG. 2 shows a second design example of a hydraulic controller.

A second design example of a hydraulic controller 10a is shown in FIG. 2. The hydraulic controller 10a differs only slightly from the hydraulic controller 10. The pumps 42, 64, the pressure limiting valves 44, 66, the switch-over valve 58, the shift valve 68, the valve 32 for normal operation, and the transmission 12 are therefore designed as described previously for FIG. 1. FIG. 2 does not include the line 70. Otherwise, all the lines are the same in FIG. 1 and FIG. 2.

A valve 36a is provided instead of the valve 36. The valve 36a includes a first control input S1 and a second control input S2, which are also acted upon by the first control line 52 and the second control line 54. A spring 34 is also provided at the second control input S2. In the first control setting I, the pressure port D is connected with the port A. In the second control setting II, the pressure port D and the port A are closed.

A line 54 is connected to the port A1 of the shift valve 68. A throttle 72 is also preferably situated in the line 74. The line 74 is connected to the line 62 that leads to the second control input S2 of the pressure limiting valve 44. In the first shift position I of the switch-over valve 58, the line 74 is therefore connected with the branching line 60. A fundamental point hereby is that the branching line 60 is connected to the intermediate line 38 or the supply line 28, which branching line 60 is connected with the first port A1 of the shift valve 68, whereby the connection in the present design example takes place by way of the lines 62, 74. The first port A1 of the shift valve is closed in the shift positions P and N, whereby the point is a closing in shift position N in particular, and first port A1 of the shift valve is connected by way of a second port A2 with a low pressure level, e.g., a tank T, in the shift positions R and/or D.

If, in emergency operation, the valve 36a is in control setting I, the transmission 12, as also described in FIG. 1, can take on a higher transmission ratio and the engine can take on a lower speed. The port A is closed in control setting II of the valve 36a, whereby the intermediate line 38 or the supply line 28 is blocked. In the shift positions R and D of the shift valve 68, oil can thus flow to the tank T by way of the supply line 28, the branching line 60, the lines 62, 74, and the shift valve 68. Due to the valve 36a, the transmission 12 in emergency operation can take on one higher transmission ratio at the most in shift positions P and N. The valve 36a has the advantage that it is very simply designed. Otherwise, the sequences are the same as described previously for FIG. 1.

A fundamental point regarding the second design example is that additional means are provided that prevent an adjustment of the transmission 12 in the "low" direction, at least in the neutral operating state. It is also advantageous to prevent this in the park operating state, however. This may also be appropriate in the reverse operating state if necessary. The additional means prevent an adjustment of the transmission 12 in that the pressure level of the delivery chamber 24 of the first adjusting device 14 is not shifted to a lower pressure level, such as a tank T. To accomplish this, a device such as the valve 36a or 68 must be provided, which is closed in the neutral operating state at the least, in a line 28, 38, 60, 74 that leads to the delivery chamber 24 of the first adjusting device 14 or on this itself. In the forward driving operating state at least, the valve 68 shifts the pressure level of the delivery chamber 24 to a lower pressure level, such as a tank T, for instance, to adjust the transmission 12 in the "low" direction.

Expressed in other words, additional means are provided in the second design example that make an adjustment of the transmission 12 in the "low" direction possible only in the forward driving D operating state. Such an adjustment in the reverse R operating state is possible as well, however. If a device is provided that makes the park P operating state or the shift position P of the shift valve 68 possible only when the vehicle is at a standstill, the adjustment can take place here as well. To accomplish this, a device such as the valve 68 must be provided in a line 28, 38, 60, 74 that leads to the delivery chamber 24 of the first adjusting device 14 or on this itself that shifts the pressure level of the delivery chamber 24 to a lower pressure level, such as a tank T, for instance, to adjust the transmission 12 in the "low" direction.

Figure 3:
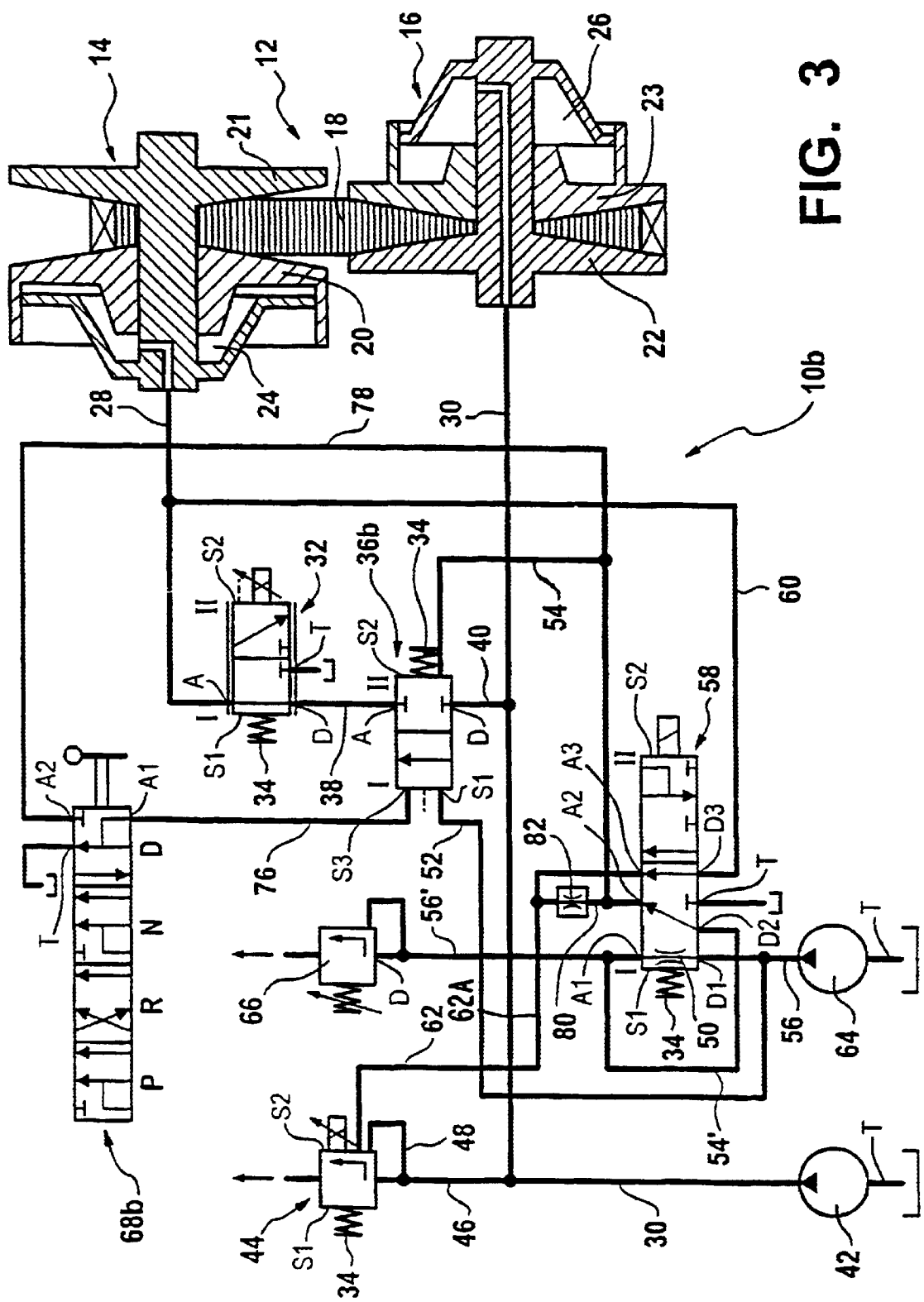
FIG. 3 shows a third design example of a hydraulic controller.

A third design example of a hydraulic controller 10b is shown in FIG. 3. The pumps 42, 64, the pressure limiting valves 44, 66, the switch-over valve 58, the valve 32 for normal operation and the transmission 12 are designed the exactly the same and connected with each other as described previously in the first design example and for FIG. 1. The line 70 shown in FIG. 1 is not included. A valve 36b is used instead of the valve 36 shown in FIG. 1. The valve 36b includes two control settings I, II. In the first control setting I, a pressure port D is connected with a port A. In the second control setting II, the pressure port D and the port A are closed. The valve 36b has a first control input S1 that is connected with the first control line 52. A spring 34 and the second control line 54 are connected at a second control input S2 which faces the first control input S1 and reacts to it when acted on by pressure. The valve 36b also includes yet a third control input S3, to which a third control line 76 is connected. A pressure present at a third control input S3 therefore functions like a pressure present at the first control input S1. Both pressures react to a pressure present at the second control input S2 and the elastic force of the spring 34.

The third control line 76 is connected to the first port A1 of the shift valve 68b. In the shift positions P, R, N, the first port A1 is connected with the second port A2. In the shift position D, the first port A1 is connected with a tank port T, the second port A2 is hereby closed, which can also be provided in the shift position R. If means are provided that make the P operating state or the shift position P of the shift valve 68 possible only when the vehicle is at a standstill, this can also be provided in the P operating state and in the P shift position of the shift valve 68b.

A line 78 that is connected with the second control line 54 is connected at the second port A2 of the shift valve 68b. Between the second control line 54 and the line 62A a connecting line 80 is provided in which a throttle 82 is preferably provided.

In the third design example, it is therefore provided that the branching line 60 is attached to the intermediate line 38 or the supply line 28, which branching line 60 is connected with the hydraulic line 56' and the second control line 54, 54'. The lines 60, 54, 54' are installed after the throttle position 50 in the delivery direction. Moreover, a line—in this case the second control line 54—branches between the throttle 82 and the throttle position 50, which leads to the second control input S2 of the valve.

It is further provided that a line—in the present design example, the line 78 that branches off from the second control line 54—is connected between the throttle 82 and the throttle position 50, which leads to the second port A2 of the shift valve 68b, which is connected with the first port A1 in the shift positions P and N, and R if necessary, to which the control line 76 is connected. The third control line 76 is connected with a third control input S3 of the valve 36b. Finally, the first port A1 of the shift valve 68b is connected with a tank port T in the shift position D.

An adjustment of the gear ratio of the transmission 12 in the "low" direction takes place in this design example, for instance, only in the D operating state or in the shift position D. The pressure in the delivery chamber 24 of the first adjusting device 14 is hereby directed to the pressure port D of the additional pressure limiting valve 66 by way of the supply line 28, the branching line 60, the switch-over valve 58, the throttle 82, the second control line 54 and the hydraulic line 56'. The pressure of the delivery chamber 24 of the first adjusting device 14 which is present at throttle 82, is reduced by the throttle 82 in such a way that the required oil volume can drain by way of the pressure limiting valve 66 to adjust the transmission 12 in the "low" direction. The size of the throttle 82 is thereby to be designed as a function of the required or desired speed for the adjustment of the transmission 12.

In the P, R, N shift positions or operating states, pressure is applied to the third control input S3 of the valve 36b by way of the third control line 76 and the line 78, whereby the speed at which the valve 36b closes is markedly reduced and an undesired adjustment of the gear ratio of the transmission 12 in the "low" direction when the engine is idling is prevented. The pressure of the delivery chamber 24 of the first adjusting device 14 reduced by the throttle 82 is present hereby at the second control input S2 as well as at the third control input S3 of the valve 36b. The resultant compressive forces counteract each other. The compressive force that results from the pressure present at the first control input S1 also counteracts the compressive force present at the second control input S2. Since oil can escape from the delivery chamber 26 by way of the pressure limiting valve 66, especially at low engine speeds, the compressive forces must be designed so that the valve 36b is brought into the control position I when adjustment of the gear ratio of the transmission 12 in the "low" direction begins, whereby a high pressure created by the first pump 42 is again directed to the delivery chamber 24 of the first adjusting device 14. The gear ratio of the transmission 12 is thereby adjusted in the "overdrive" direction again.

A fundamental point about the third design example is that additional means are provided that prevent adjustment of the transmission 12 in the "low" direction, at least in the reverse operating state. It is also advantageous to prevent this in the park operating state, however. This may also be appropriate in the reverse operating state if necessary. Using the additional means, a high pressure level is switched to that of the delivery chamber 24 of the first adjusting device 13. Basically, this is carried out the valves 36b, 68b, whereby pressure is applied to the valve 36b by way of the valve 68b and the lines 54, 78, 76 in such a way that it shifts the high pressure level to that of the delivery chamber 24 of the first adjusting device 14.

On the other hand, it can also be said that the additional means make an adjustment of the transmission 12 in the "low" direction possible only in the forwarding driving operating state. Such an adjustment is also possible in the reverse R operating state, however. If a device is provided that makes the park P operating state or the P shift position of the shift valve 68b possible only when the vehicle is at a standstill, the adjustment can take place here as well. The additional means are basically the lines 60, 54, 56, 82, which are connected with the pressure limiting valve 66 in the corresponding operating states of forward driving D and, if necessary, reverse R, and, possibly, park P.

Yet another possibility is explained, by means of which an undesiredly rapid adjustment of the transmission 12 in the "low" direction in particular is prevented to the greatest extent possible in the neutral operating state at least. Such a hydraulic controller for a continuously variable transmission 12 can also be designed as extensively as possible like the hydraulic controller 10 according to FIG. 1. In contrast to the means explained previously, however, which prevent an adjustment of the transmission 12 in the "low" direction in the neutral operating state at least, additional means are also provided for an adjustment of the transmission 12 in the "low" direction which is adapted to the decrease in vehicle speed, at least in the neutral operating state. This can also be provided for the park operating state and, if necessary, for the reverse operating state.

If a vehicle travelling at a certain speed is shifted from the forward driving or reverse operating state into the neutral operating state, the speed decreases according to a certain function on a level course if the brakes are not applied and except if the vehicle is travelling downhill. This function basically depends on the speed, weight, air resistance, rolling resistance, etc. of the vehicle. If enough gas is not given in the neutral operating state, which is the case at idle in particular, oil can escape from the delivery chamber 24 of the first adjusting device, whereby the transmission 12 is adjusted in the "low" direction. The escape of the oil from the delivery chamber 24 and, therefore, the adjustment of the transmission 12 in the "low" direction can now be slowed in such a way that, when the vehicle is again shifted into the forward or reverse operating state, the transmission 12 has a transmission ratio that does not result in an abrupt increase in engine speed and, therefore, does not cause the vehicle to stop abruptly. An appropriate means for this is an additional throttle, for instance, that is situated in a line that is activated in the neutral operating state at least, in the park operating state if necessary, and possibly in the reverse operating state in such a way that the oil is directed from the delivery chamber 24 to a lower pressure level, such as a tank T, for example. As an alternative, the oil can also be directed to a pressure limiting valve having a corresponding pressure level.

The vehicle-specific values for the size of the throttle can be determined within the framework of a few tests. To this end, for instance, a vehicle is shifted from forward driving to neutral at different speeds, especially on a level course. The change in speed of the vehicle over time is then measured. If this is also carried out for vehicles of different weights, multiple curves can be determined that reflect the decrease in speed over time. Based on this information a throttle is determined that serves to provide an adjustment of the transmission 12 in the "low" direction that is similar or adjusted over time. If the vehicle is now shifted from neutral back to forward driving once more at a certain point in time, this does not result in an abrupt deceleration of the vehicle, because the gear ratio of the transmission 12 achieved is adjusted for the speed of the vehicle.

The selection of the throttle and, therefore, the time of the adjustment of the transmission 12 in the "low" direction can take place according to different criteria. These can be aspects optimized for consumption or gear ratios that the vehicle passengers perceive as comfortable. It is also possible to set the adjustment in the "low" direction in such a way that, when the vehicle is shifted in the forward or reverse operating state, the greatest possible torque is available. An adjustment of the transmission 12 in the "low" direction is usually carried out very slowly or with delay, however.

What is claimed is:

1. Hydraulic controller (10, 10a, 10b) for a continuously adjustable transmission (12), at least during a failure of the electrical power supply to an electrohydraulic controller of the continuous transmission (12), whereby means (36, 36a, 36b, 44, 50, 68, 68b) are provided that, in the forward driving operation state, make possible an adjustment of the transmission (12) in the "low" direction, and at least in the neutral operating state serve for preventing an adjustment of the transmission (12) in the "low" direction.

2. Hydraulic controller (10, 10a, 10b) for a continuously adjustable transmission (12), at least during a failure of the electrical power supply to an electrohydraulic controller of the continuous transmission (12), having at least one first pump (42) to act upon the delivery chambers (24, 26) of a first and second adjusting device (14, 16) to alter the transmission ration of a transmission (12), whereby means (36, 6a, 36b, 44, 50, 68, 68b) are provided that, in the forward driving operating state, make an adjustment of the transmission (12) in the "low" and "overdrive" directions possible in one shift position (D) and that in at least the neutral operating state serve to make possible an adjustment of the transmission (12) in the "low" direction that is adapted to a decrease in the vehicle speed.

3. Hydraulic controller (10, 10a, 10b) according to claim 1 or 2, characterized in that the means (36, 36a, 36b, 44, 50, 68, 68b) are formed to prevent an adjustment of the transmission (12) in the "low" direction, at least in the neutral and park operating states.

4. Hydraulic controller (10, 10a, 10b) according to claim 1 or 2 characterized in that the means (36, 36a, 36b, 44, 50, 68, 68b) are formed to prevent an adjustment of the transmission (12) in the "low" direction, at least in the neutral, park and reverse operating states.

5. Hydraulic controller (10, 10a, 10b) according to claim 1 or 2 through 3, characterized in that the means (36, 36a, 36b, 44, 50, 68, 68b) are formed to make an adjustment of the transmission (12) possible in the "low" and "overdrive" directions in one shift position (R) in the reverse operating state.

6. Hydraulic controller (10, 10a, 10b) according to claim 1, characterized in that at least one valve (36, 36a, 36b) is provided to control the pressure in at least one delivery chamber (24) of the first adjusting device (14), which, at least during a failure of the electrical power supply to an electrohydraulic controller of the continuous transmission (12), can be controlled using a pressure drop created at a throttle position (50) and which is a function of the speed of an engine driving the pump (42).

7. Hydraulic controller (10, 10a, 10b) according to claim 1, characterized in that a device is provided for the park, reverse, neutral and forward driving operating states, especially a shift valve (68, 68b) having at least four shift positions (P, R, N, D) for the park, reverse, neutral and forward driving operating states.

8. Hydraulic controller (10) according to claim 1, characterized in that, in a second control setting (II) of a valve (36), a downstream line (28,38) at a port (A) of the valve (36) is connected with a discharge port (A') of the valve (36), that the discharge port (A') is connected by way of a line (70) in which a throttle (72) is preferably situated with a first port (A1) of a shift valve (68) which is closed in the first and second shift positions (P) and (N), and which is connected with a second port (A2) that leads to a tank (T), at least in a third shift position (D).

9. Hydraulic controller (10a, 10b) according to claim 8, characterized in that the port (A) is closed in the second control setting (II) of the valve (36a, 36b).

10. Hydraulic controller (10a, 10b) according to claim 9, characterized in that a branching line (60, 74) is connected to a line (28, 38) installed after the valve (36a, 36b), which branching line (60, 74) is connected with a first port (A1) of the shift valve (68, 68b), before which a throttle (72) is preferably provided, which is closed at least in the shift positions (P) and (N), and which, in the shift position (D) at least, is connected with a second port (A2) that leads to a tank (T).

11. Hydraulic controller (10b) according to claim 10, characterized in that a line (60) is connected to a line (28, 38) installed after the valve (36b), which is connected with a line (54, 56') by way of an intermediate line (80) that is installed after a throttle position (50) in the delivery position, and that a throttle (82) is situated in the intermediate line (80).

12. Hydraulic controller (10b) according to claim 11, characterized in that a control line (54) branches between the throttle (82) and the throttle position (50) that leads to a second control input (S2) of the valve (36b).

13. Hydraulic controller (10b) according to claim 12, characterized in that a line (54, 60) is connected between the throttle (82) and the throttle position (50) that leads to a second port (A2) of the shift valve (68b), which is connected with a first port (A1) in the shift positions (P, R and N) to which a control line (76) is connected that is connected with a third control input (S3) of the valve, and that the port (A) of the valve (36b) is connected with a tank port (T) in the shift position (D).

14. Hydraulic controller (10, 10a, 10b) according to claim 1, characterized in that a supply line (30) of a delivery chamber (26) of a second adjusting device (16) is connected with a pressure port (D) of a pressure limiting valve (44), on a first control input (S1) of which a spring (34) is provided, and on a second control input (S2) of which an electrical or hydraulic actuation and a return line (48) that is connected with a supply line (30) are provided.

15. Hydraulic controller (10, 10a, 10b) according to claim 1, characterized in that a throttle position (50) is situated in a switch-over valve (58) having two shift settings (I, II), that a spring (34) is provided on a first control input (S1) of the switch-over valve (58) and an electrical or hydraulic actuation is provided on its second control input (S2), that the switch-over valve (58) includes at least a first pressure port (D1) and a first port (A1) that are connected with each other in the first shift position (I) by way of the throttle position (50) and, in the second shift position (II), by way of a connection that is basically free of a pressure drop, that a first control line (52) is provided that is connected in the delivery direction before a switch-over valve (58) and is connected with the first control input (S1) of a valve (36, 36a, 36b), and a control line (54, 54') is situated in the delivery direction after the switch-over valve (58) that is connected with the second control input (S2) of the valve (36, 36a, 36b).

16. Hydraulic controller (10, 10a, 10b) according to claim 15, characterized in that the control line (54'), which is installed in the delivery direction after the switch-over valve (58), is connected with a second pressure port (D2) of the switch-over valve (58) which is connected with a second port (A2) in the first shift position (I) which is connected with the second control input (S2) of the valve (36, 36a, 36b) by way of the second control line (54), that the second pressure port (D2) in the second shift position (II) of the switch-over valve (58) is closed, that the switch-over valve (58) includes a tank port (T) that is closed in the first shift position (I) and is connected with the second port (A2) in the second shift position (II).

17. Hydraulic controller (10, 10a, 10b) according to claim 15, characterized in that a branching line (60) that is connected with a delivery chamber (24) of a first adjusting device (14) is connected to a third pressure port (D3) of the switch-over valve (58) which is connected with a third port (A3) in the first shift position (I), and which is closed in the second shift position (II), that the third port (A3) is connected by way of a line (62) with the second control input (S2) of a pressure limiting valve (44), and that the third port (A3) is connected with a tank port (T) of the switch-over valve (58) in the second shift position (II) of the switch-over valve (58).

18. Hydraulic controller (10, 10a, 10b) according to claim 1, characterized in that at least one first pump (42) is provided to act upon delivery chambers (24, 26) of a first and second adjusting device (14, 16) to alter the transmission ratio of the transmission.

19. Hydraulic controller (10, 10a, 10b) according to claim 18, characterized in that a throttle position (50) is installed after at least one second pump (64) which creates a lower pressure range than the at least first pump (42).

20. Hydraulic controller (10, 10a, 10b) according to claim 19, characterized in that the at least first pump (42) is a high-pressure pump, and the at least second pump (64) is a low-pressure pump.

21. Hydraulic controller (10, 10a, 10b) according to claim 1, characterized in that an additional pressure limiting valve (66) is installed after a throttle position (50).

22. Hydraulic controller (10, 10a, 10b) according to claim 1, characterized in that a valve (36, 36a, 36b) is also used for normal operation of the hydraulic controller (10, 10a, 10b).

23. Hydraulic controller (10, 10a, 10b) according to claim 1, characterized in that a first valve (36, 36a, 36b) is provided for emergency operation, and a second valve (32) is provided for normal operation.

* * * * *